US009496744B2

(12) United States Patent
Porat et al.

(10) Patent No.: US 9,496,744 B2
(45) Date of Patent: Nov. 15, 2016

(54) WIRELESS CHARGING OPTIMIZATION UTILIZING AN NFC MODULE THAT DETECTS INDUCED CURRENT AND PROVIDES AN INDICATION OF INDUCED CURRENT

(71) Applicants: Shahar Porat, Geva Carmel (IL); Gary Matos, Portland, OR (US); Adam D Rea, Lynnwood, WA (US); Songnan Yang, San Jose, CA (US)

(72) Inventors: Shahar Porat, Geva Carmel (IL); Gary Matos, Portland, OR (US); Adam D Rea, Lynnwood, WA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 13/721,164

(22) Filed: Dec. 20, 2012

(65) Prior Publication Data

US 2014/0176054 A1    Jun. 26, 2014

(51) Int. Cl.
*H02J 7/00* (2006.01)
*H02J 7/02* (2016.01)
*H04B 5/00* (2006.01)
*H01Q 1/22* (2006.01)
*H01F 5/00* (2006.01)
*H01Q 7/00* (2006.01)

(52) U.S. Cl.
CPC ............... *H02J 7/025* (2013.01); *H02J 50/90* (2016.02); *H01F 5/003* (2013.01); *H01Q 1/2216* (2013.01); *H01Q 1/2266* (2013.01); *H01Q 7/00* (2013.01); *H02J 50/20* (2016.02); *H02J 50/80* (2016.02); *H04B 5/0081* (2013.01); *Y10T 29/49016* (2015.01)

(58) Field of Classification Search
CPC ...... H02J 7/025; H02J 5/005; H04B 5/0081; H04B 5/0025; H01F 5/003; H01Q 1/2266; H01Q 7/00; H01Q 1/2216; Y10T 29/49016
USPC ................... 320/107–108, 107–105
See application file for complete search history.

(56) References Cited

U.S. PATENT DOCUMENTS

| 7,248,834    B2   | 7/2007  | Matsuo et al. |
| 7,952,322    B2 * | 5/2011  | Partovi et al. ............... 320/108 |
| 8,957,633    B2 * | 2/2015  | Yoon ............................ 320/108 |
| 9,024,576    B2 * | 5/2015  | Maenpaa ...................... 320/108 |
| 2006/0061325 A1 * | 3/2006  | Tang ...................... H02J 7/025 320/108 |
| 2007/0103110 A1   | 5/2007  | Sagoo |
| 2009/0102663 A1 * | 4/2009  | Hillegass ............. G06K 7/0008 340/572.5 |
| 2010/0253532 A1 * | 10/2010 | Pernisek et al. ............. 340/825 |

(Continued)

FOREIGN PATENT DOCUMENTS

| KR | 10-2006-0026960 A | 3/2006 |
| KR | 10-2012-0135885 A | 12/2012 |
| WO | 2014/099009 A1    | 6/2014 |

OTHER PUBLICATIONS

International Preliminary Report on Patentability and Written Opinion Received for PCT Patent Application No. PCT/US2013/047799, mailed on Jul. 2, 2015, 9 pages.

(Continued)

*Primary Examiner* — Stacy Whitmore
(74) *Attorney, Agent, or Firm* — Forefront IP Lawgroup, PLLC (57) ABSTRACT

Described herein are techniques related to near field coupling and wireless charging or wireless power transfer (WPT). More particularly, an induced current at a receiving coil antenna is measured and utilized as a basis for re-alignment with a transmitting coil antenna is described.

17 Claims, 5 Drawing Sheets

(56) References Cited

U.S. PATENT DOCUMENTS

| | | | | |
|---|---|---|---|---|
| 2012/0119588 A1* | 5/2012 | Baarman | ............... | H02J 5/005 307/104 |
| 2012/0248883 A1* | 10/2012 | Konanur | ............... | H01F 21/12 307/104 |
| 2012/0248891 A1 | 10/2012 | Drennen | | |
| 2013/0157565 A1* | 6/2013 | Clement et al. | ............ | 455/41.1 |
| 2013/0293190 A1* | 11/2013 | Pijnenburg et al. | .......... | 320/108 |
| 2014/0002225 A1* | 1/2014 | Konanur et al. | ............. | 336/200 |
| 2014/0002313 A1* | 1/2014 | Yang et al. | ................. | 343/702 |

OTHER PUBLICATIONS

International Search Report and Written Opinion received for PCT Patent Application No. PCT/US2013/047799, mailed on Oct. 8, 2013, 12 pages.

* cited by examiner

WIRELESS CHARGING OPTIMIZATION UTILIZING AN NFC MODULE THAT DETECTS INDUCED CURRENT AND PROVIDES AN INDICATION OF INDUCED CURRENT

BACKGROUND

Recently, technologies have arisen that allow near field coupling (such as wireless power transfers (WPT) and near field communications (NFC)) between electronic devices in close proximity to each other and more particularly, thin portable electronic devices. Both near field coupling functions use radio frequency (RF) antennas in each of the devices to transmit and receive electromagnetic signals. Because of user desires (and/or for esthetic reasons) many of these portable devices are small (and becoming smaller), and tend to have exaggerated aspect ratios when viewed from the side. As a result, many of these thin portable devices incorporate flat antennas, which use coils of conductive material as their radiating antennas for use in near field coupling functions.

A conventional wireless charging configuration in the thin portable devices includes a limited operational function. For example, the thin portable device is limited to indicate presence of charging or non-charging between portable devices. In this example, energy is wasted due to poor charging performance. Accordingly, an algorithm may be implemented to optimize the WPT between these portable devices.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling coil antennas of portable devices and more particularly for coupling coil antennas of thin portable electronic devices for improving near field coupling capabilities of the portable devices. Near field coupling includes (by way of illustration and not limitation) wireless power transfer (WPT) and/or near field communications (NFC) capabilities of the portable devices.

For example, the portable device includes a continuous loop of coil antenna that is coupled to an NFC module. The coil antenna may be utilized for the WPT such as, for example, when the coil antenna is exposed to magnetic fields that induce current to the coil antenna. The induced current is measured and compared by an algorithm or protocol to an amount of transmitted power from another portable device that contains the transmitting coil antenna. For example, if the induced current is way below the amount of the transmitted power, then the algorithm may be configured to stop the transmission of power to the portable device to be charged. In another example, the algorithm may be configured to indicate re-alignment of the portable device to be charged with the transmitting coil antenna of the other portable device until maximum power transfer is obtained.

As an example of present implementation herein, an amplitude detector component, an analog to digital converter (ADC) component, and a receiver indicator lights component are added into the NFC module of the portable device in order to assist a user during the re-alignment to obtain the maximum power transfer during the WPT. For example, the induced current is measured by the amplitude detector component. In this example, the measured induced current is converted into a digital signal by the ADC component. In an implementation, the digital signal may be utilized to power up the receiver indicator lights, or it may be utilized by the algorithm in controlling the transmission of power at the transmitting side.

Figure 1:
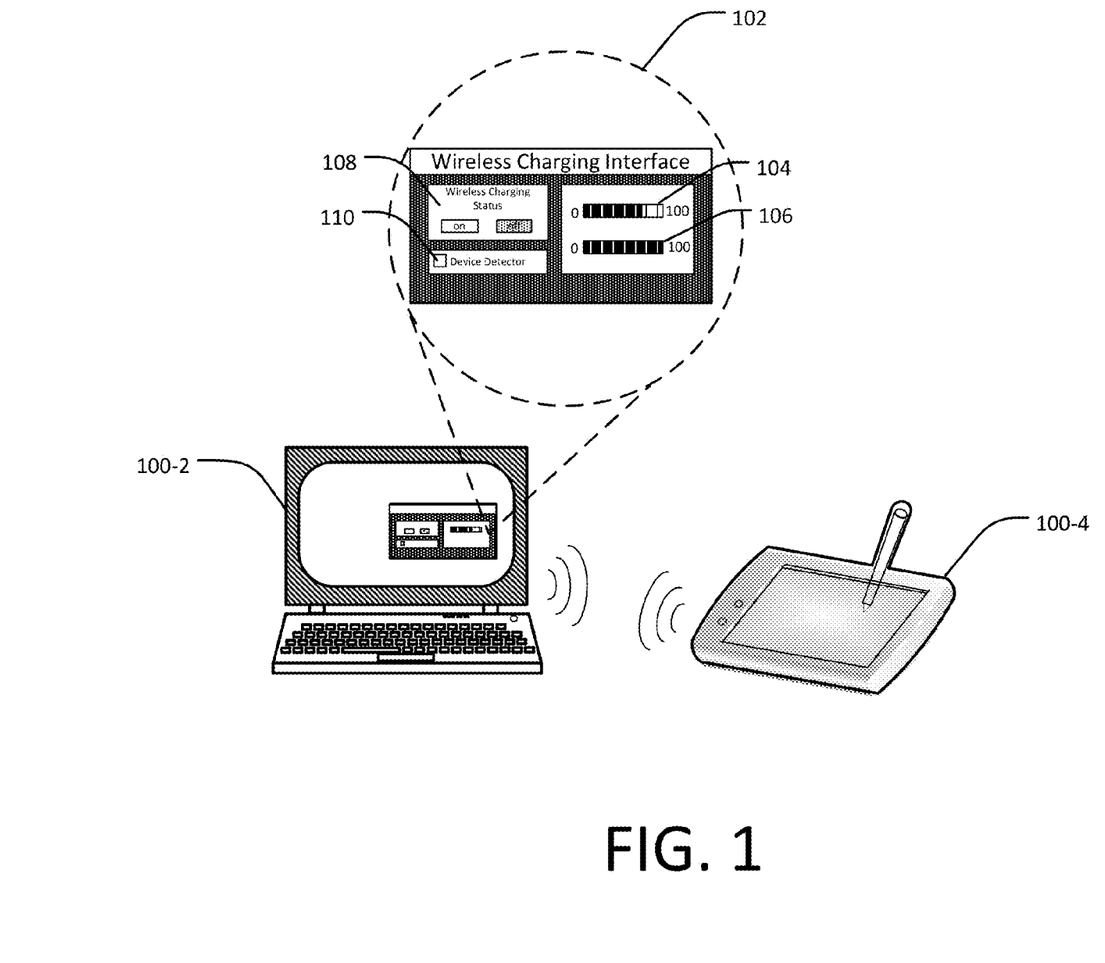
FIG. 1 illustrates portable devices in an example near field coupling arrangement.

FIG. 1 illustrates an example arrangement of portable devices for near field coupling. More particularly, users may have a desire to operate near field coupling enabled portable electronic devices and/or other devices in certain ergonomically convenient manners. Examples of such portable devices include (but are not limited to) an Ultrabook, a mobile phone, a cellular phone, a smartphone, a personal digital assistant, a tablet computer, a personal computer (PC), a netbook, a notebook computer, a laptop computer, a multimedia playback device, a digital music player, a digital video player, a navigational device, a digital camera, and the like.

In an implementation, FIG. 1 shows a so-called "NFC bump" where two users (not shown) "bump" their NFC-enabled portable devices 100-2 and 100-4 together in a side-to-side manner to perform NFC-related information sharing functions. For example, the NFC-related information sharing functions include data communications and wireless charging (i.e., WPT) between the portable device 100-2 and the portable device 100-4. In other implementations, a corner-to-corner (not shown), or a front-to-back (not shown), or a back-to-back (not shown) manner may be performed for the "NFC bump." In these implementations, an algorithm is employed in the portable devices 100 to provide maximum efficiency and optimization of the wireless charging.

As an example of present implementation herein, the portable devices 100 may include a coil antenna (not shown) to establish near field coupling in order to perform the NFC-related information sharing functions. In this example, the portable device 100-2 may transmit information (e.g., data packets) and charging power to the portable device 100-4. The transmitted information may contain, for example, current amount or measured amount of the charging power (i.e., transmitted power) that is generated by the portable device 100-2 to charge the portable device 100-4. Similarly, the portable device 100-4 may transmit or communicate to the portable device 100-2 the current amount of received power in order to implement the algorithm as mentioned above. The communication or the WPT between the devices 100 may utilize NFC signal, an infra-red (IR) signal, a BlueTooth™ signal, a cellular signal, or other radio frequency (RF) signal.

As shown, FIG. 1 illustrates a user interface window 102 in the portable device 100-2 that displays current status/output of the algorithm. For example, the user interface window 102 shows received power 104 of the portable device 100-4, charging power 106, wireless charging status 108, and device detector 110. In this example, the algorithm is implemented to avoid poor charging performance, energy waste, and electromagnetic interference (EMI) problems by optimizing arrangement of the portable devices 100 during the WPT.

As an example of current implementation herein, the device detector 110 may display if another portable device (e.g., portable device 100-4) is currently within proximity zone of the near field coupling. In this example, the proximity zone may contain few millimeters in distance. If there is a detection of another portable within this proximity zone, then the wireless charging status 108 may be utilized by the user to activate the wireless charging feature of the portable device 100-2. For example, the user may activate the WPT by clicking the "ON" button at the wireless charging status 108.

In an implementation, the algorithm may be configured to stop the WPT by the portable device 100-2 when the received power as shown by the received power 104 is much smaller compared to the charging power 106. In other words, if there is non-alignment of the coil antenna between the portable devices 100, then the portable device 100-2 may stop charging power transmission to avoid energy waste. As further discussed below, a threshold is configured to determine whether to stop or to continue with the WPT by the portable device 100-2.

Figure 2A:
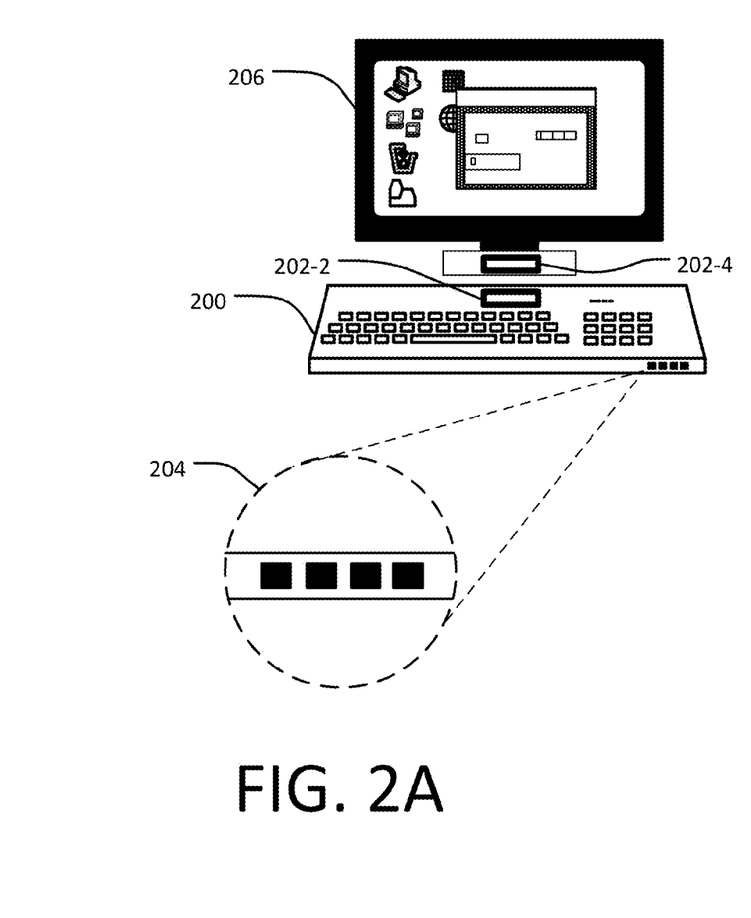
FIG. 2A illustrates an example arrangement of aligned coil antennas in portable devices during wireless charging or wireless power transfer (WPT).

FIG. 2A illustrates an example arrangement of aligned coil antennas of the portable devices during wireless charging or WPT. For example, FIG. 2A shows a wireless keyboard 200 with a coil antenna 202-2 and a receiver power indicator 204. Furthermore, FIG. 2A shows an All-in-One (AIO) PC 206 with a coil antenna 202-4 that is used to transmit charging power to the wireless keyboard 200.

As an example of present implementation herein, the receiver power indicator 204 displays a full bar (i.e., maximum power transfer) when the coil antenna 202-2 is aligned with the coil antenna 202-4. In other words, a high coupling coefficient is generated when most of magnetic fluxes (not shown) from the transmitting coil antenna 202-4 are penetrating the receiver coil antenna 202-2. The coupling coefficient may further depend upon distance between the inductive coil antennas 202, their shapes, and sizes. For example, the shapes of the coil antennas 202 such as its loop areas may be configured to resonate at a particular distance. In this example, maximum energy transfer is obtained at the receiver coil antenna 202-2.

Figure 2B:
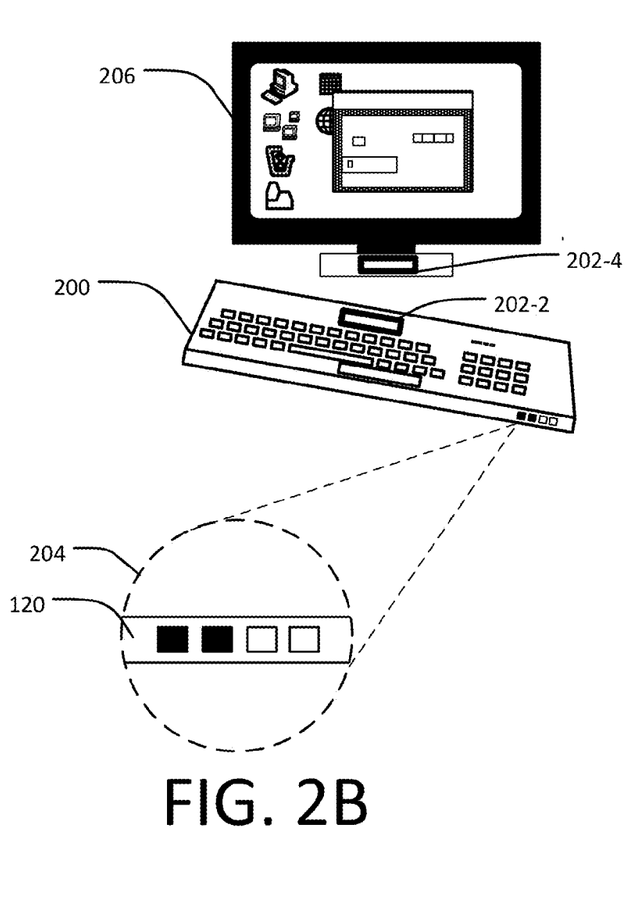
FIG. 2B illustrates an example arrangement of non-aligned coil antennas in portable devices during wireless charging or wireless power transfer (WPT).

FIG. 2B illustrates an example arrangement of non-aligned coil antennas in the portable devices during wireless charging or WPT. For example, FIG. 2B shows the receiver power indicator 204 to display a half-full bar (i.e., lesser power transfer) when the receiving coil antenna 202-2 is not aligned with the transmitting coil antenna 202-4. In other words, a lower coupling coefficient is generated when most of magnetic fluxes (not shown) from the transmitting coil antenna 202-4 are not penetrating the receiver coil antenna 202-2.

As an example of present implementation herein, the algorithm to optimize WPT may be configured to stop transmission of power by the transmitting coil antenna 202-4 in case of total non-alignment between the coil antennas 202. In this example, the AIO PC 206 may receive information with regard to an amount of received power and compares this information to the threshold that is configured for transmitting or non-transmitting of the charging power by the AIP PC 206. For example, if the amount of received power (i.e., as displayed at received power 104 in FIG. 1) shows about fifty percent or less of a full transmission power (i.e., as displayed at the charging power 106 in FIG. 1), then the transmission of the charging power by the coil antenna 202-4 is stopped. In this example, the user may move up, move down, or move sideways the wireless keyboard 200 to obtain greater penetration of the magnetic fluxes to the coil antenna 202-2. In another example, the AIO PC 206 may be configured to show (e.g., through user interface window 102) the particular movement or direction that the user has to make in moving the wireless keyboard 200.

Figure 3A:
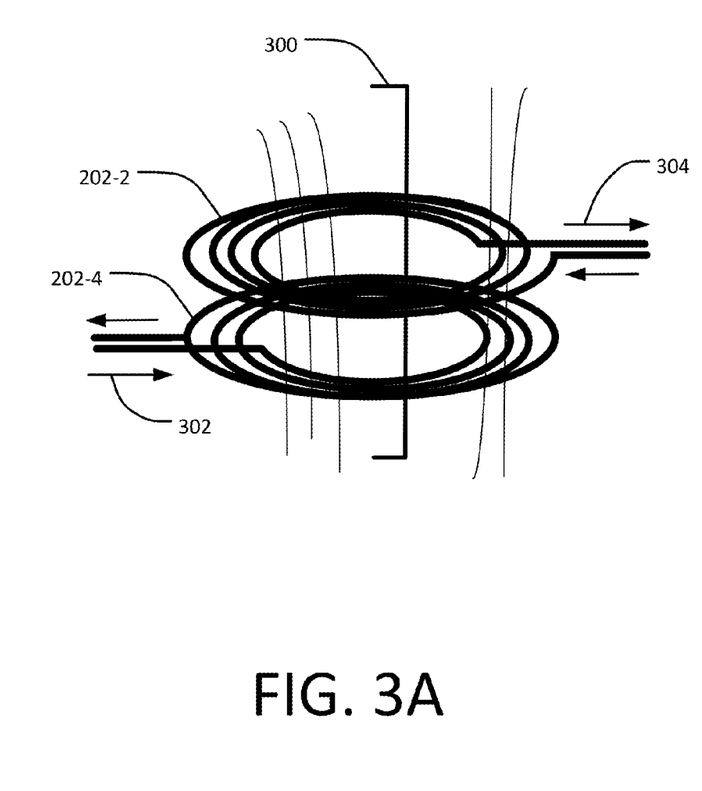
FIG. 3A illustrates an example arrangement of a transmitting coil antenna that is aligned to a receiving coil-antenna for maximum wireless power transfer.

FIG. 3A illustrates an example arrangement of a transmitting coil antenna that is aligned with a receiving coil antenna for maximum wireless power transfer. FIG. 3A shows the transmitting coil antenna 202-4 of the AIO PC 206 at the bottom and the receiving coil antenna 202-2 of the wireless keyboard 200 at the top. Furthermore, for illustration purposes, FIG. 3A shows a cross-sectional view 300 of the aligned coil antennas 202-2 and 202-4, a transmission current 302, and an induced current 304.

As an example of present implementations herein, the wireless keyboard 200 or the portable devices 100 may include a continuous loop of coil antenna 202 that is mounted on, embedded in, or otherwise associated with the wireless keyboard 200 or portable devices 100. This coil antenna 202 may be fabricated in a flexible printed circuit (FPC) and configured as a dedicated coil antenna for NFC and/or WPT purposes. In other words, the coil antenna 202 may be configured to operate on a separate resonant frequency (e.g., 13.56 MHz to implement NFC and/or WPT operations), and the coil antenna 202 is independent from another coil antenna that uses other frequencies in wireless communications (e.g., 5 GHz for Wi-Fi signals). The coil antenna 202 is supported by an NFC module (not shown) that contains a circuitry such as amplifier, rectifiers, proximity detector, and the like.

As an example of present implementations herein, the transmission current 302 is supplied through the NFC module that is configured to supply the transmission current 302 during the wireless power transfer or at transmit mode. On the other hand, the induced current 304 is due to magnetic fluxes (not shown) that penetrates the receiving coil antenna 202-2.

Figure 3B:
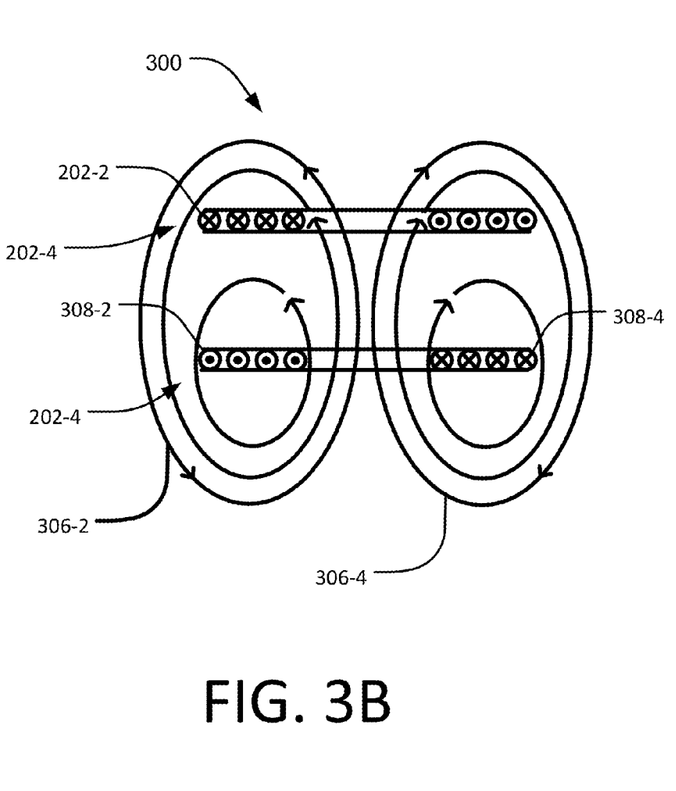
FIG. 3B illustrates a cross-sectional view of aligned coil antennas to show an operation of the coil antennas during wireless power transfer (WPT).

FIG. 3B illustrates the cross-sectional view 300 of aligned coil antennas to show an operation of the coil antennas during wireless power transfer (WPT). For purposes of illustration, FIG. 3B shows the coil antenna 202-4 at transmit mode while the coil antenna 202-2 is at receive mode. As shown, FIG. 3B includes magnetic fields 306 and current directions 308 of the transmission current 302.

As an example of present implementation herein, the transmitting coil antenna 202-4 is supplied with the transmission current 302 that flows in a clockwise direction. In other words, when viewed from the cross-sectional view 300, the transmission current 302 will be coming outward at direction 308-2 and flows back inward at the other loop as shown by direction 308-4. For the transmission current 302 that flows in the direction 308-2, generated magnetic fields 306-2 will flow in a counter-clockwise direction. These magnetic fields 306-2 are perpendicular to the direction 308-2 of the transmission current 302. Similarly, when the transmission current 302 flow in the direction 308-4, generated magnetic fields 306-4 will flow in a clockwise direction. These magnetic fields 306-4 are perpendicular to the direction 308-4 of the transmission current 302. In other words, the directions 308 of the magnetic fields 306 assist one another during the transmission of the charging power by the coil antenna 202-2.

As an example of present implementation herein, maximum coupling coefficient or a maximum inductive power transfer may be derived at the resonant frequency where the magnetic fields 306 are received at a particular distance and alignment between the coil antennas 202-2 and 202-4. In this example, the alignment of the receiving coil antenna 202-2 to the transmitting coil antenna 202-4 creates greater chances for the magnetic fields 306 to penetrate the receiving coil antenna 202-2. On the other hand, the particular distance between the receiving coil antenna 202-2 and the transmitting coil antenna 202-4 may provide in-phase relationship between the magnetic fields 306 and the magnetic fields (not shown) in the receiving coil antenna 202-2. The in-phase relationship will generate the maximum power transfer between the coil antennas 202-2 and 202-4.

In an opposite scenario (not shown) where the receiving coil antenna 202-2 is not aligned or is located relatively far from the transmitting coil antenna 202-4, the penetrations of the magnetic fields 306 at the receiving coil antenna 202-2 may be relatively minimal. Furthermore, the magnetic fields between the coil antennas 202 may be out-of-phase with one another. This out-of-phase relationship may result to the EMI at frequencies other than the resonant frequency. Consequently, a lesser amount of induced current 304 is created at the receiving coil antenna 202-2 and this information (i.e., lesser amount) is communicated to the AIO PC 206. For example, the information may be utilized by the algorithm in stopping or continuing the transmission of the charging power by the transmitting coil antenna 202-4 in the AIO PC 206.

Figure 4:
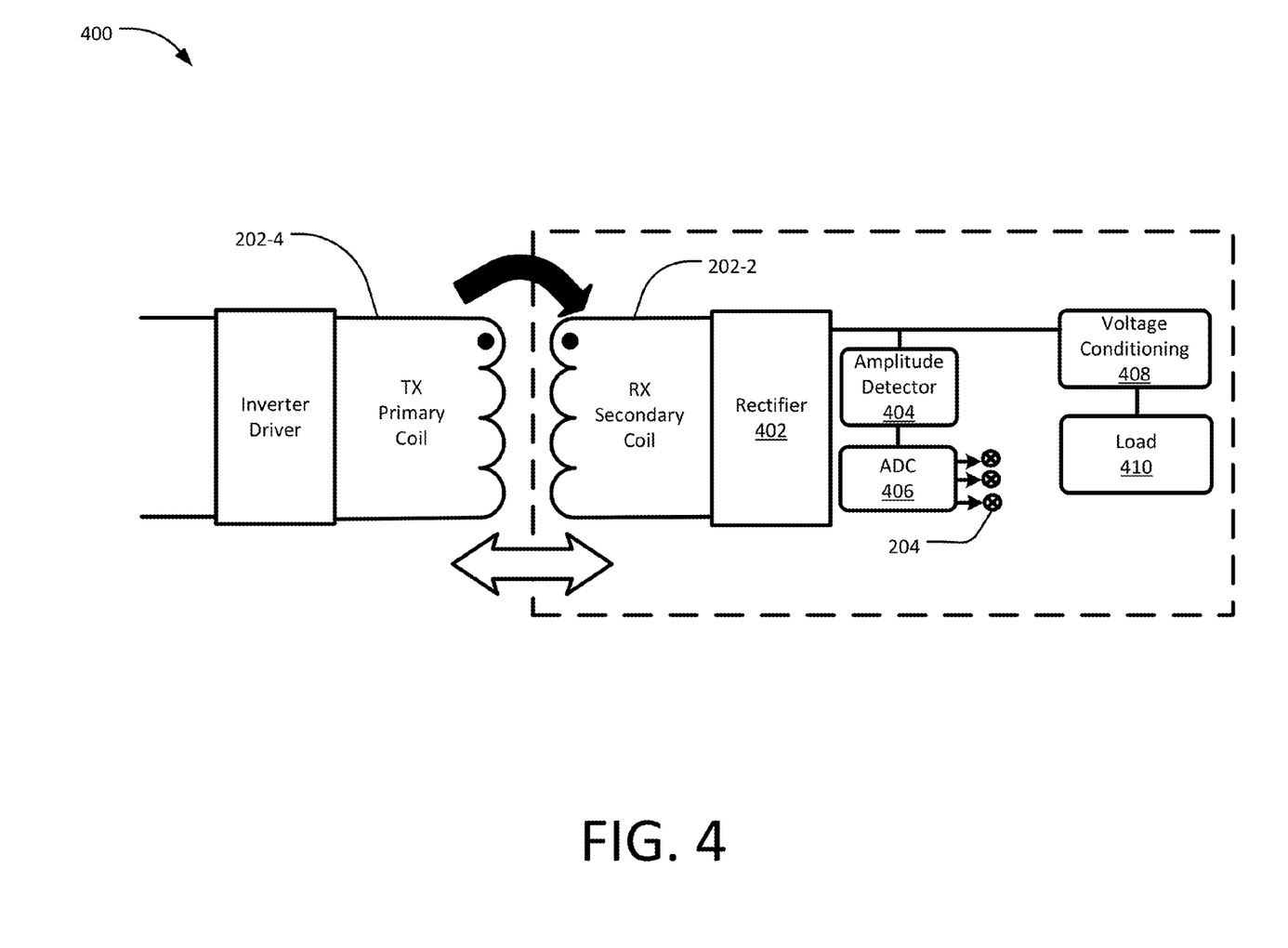
FIG. 4 illustrates an example system blocks of a receiver antenna during wireless power transfer (WPT).

FIG. 4 illustrates an example system 400 of a receiver antenna during wireless power transfer. For example, the system 400 contains the coil antenna 202-4 as a transmitting primary coil, the coil antenna 202-2 as a receiver secondary coil, a rectifier 402, an amplitude detector 404, an analog to digital (ADC) 406, a voltage conditioning 408, and a load 410. In an implementation, the rectifier 402, amplitude detector 404, ADC 406, and the voltage conditioning 408 are components of the NFC module that is coupled to the receiver coil antenna 202-2. In this implementation, the NFC module is configured to support the coil antenna 202-2 during transmit and receive mode.

As an example of present implementation herein, the coil antenna 202-4 is supplied with the transmission current 302 to generate the magnetic fields 306. In this example, the magnetic fields 306 penetrate the coil antenna 202-2 to create the induced currents 304. Furthermore, the induced currents 304 are received and transformed by the rectifier 402 from alternating induced currents 304 (i.e., AC) into direct currents (DC).

As an example of present implementation herein, the amplitude detector 404 is configured to detect the amplitude of the rectified induced currents 304. In this example, the detected amplitude is supplied to the ADC 406 where the detected amplitude of the rectified induced currents 304 (i.e., DC) is converted into digital signals (not shown).

As an example of present implementation herein, the digital signals may be provided to the receiver signal indicator 204 to display the amount of received charging power (i.e., transmitted from the coil antenna 202-4). In another example, the digital signals may be utilized by the coil antenna 202-2 to inform the AIO PC 206 of this received charging power. In this example, the algorithm may implement the shutting-off of the charging power transmission by the AIO PC 206 in order to avoid energy waste.

In an implementation, the voltage conditioning 408 may include further processing such as, amplification of the rectified induced currents 304 before they are directed to the load 410. Typically, the load 410 may be a processor (not shown), a memory (not shown), or the like.

Figure 5:
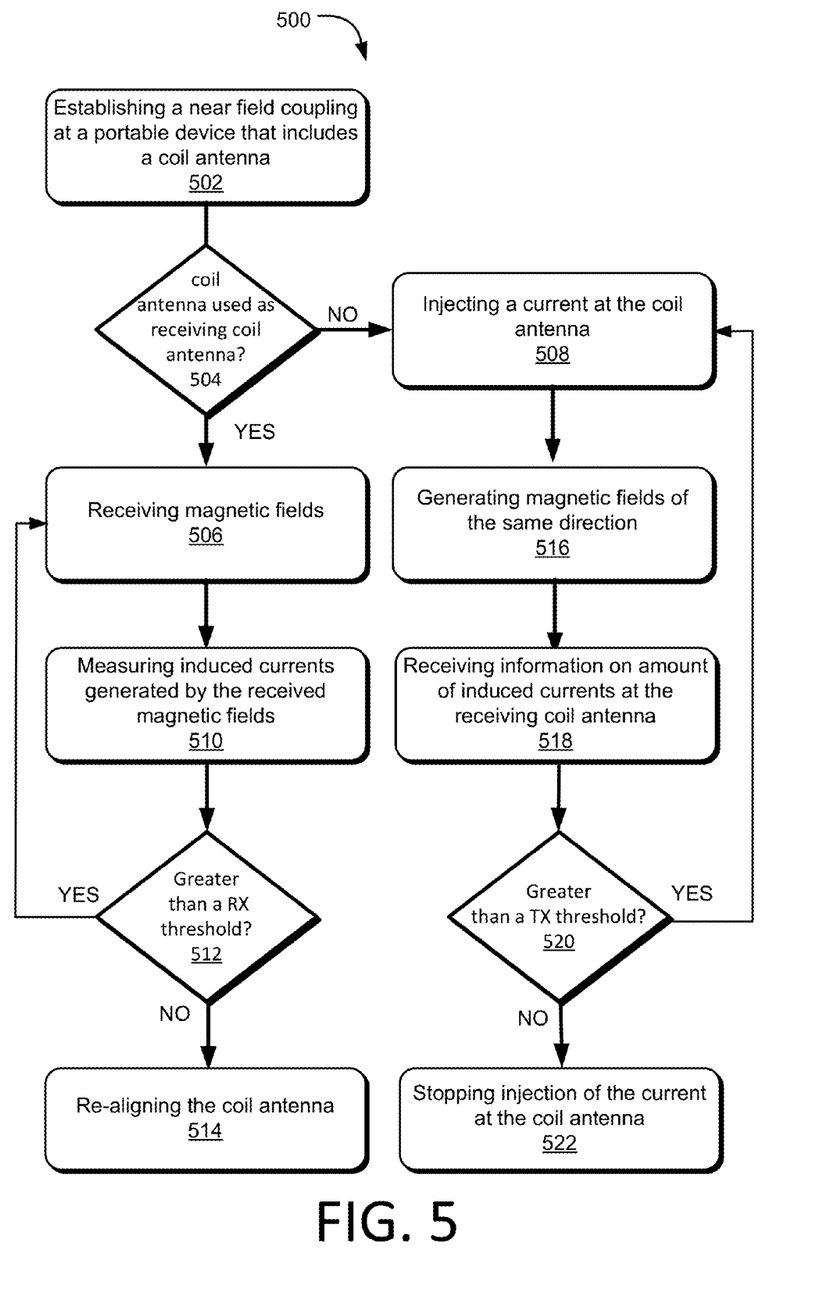
FIG. 5 is an example process chart illustrating an example method for wireless power transfer (WPT) in a portable device.

FIG. 5 shows an example process chart illustrating an example method for WPT in a portable device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, establishing a near field coupling at a portable device is performed. In an implementation, a first portable device (e.g., portable device 100-2) may establish near field coupling with a second portable device (e.g., portable device 100-4) by placing the portable device 100-2 near the portable device 100-4, or vice-versa. In an implementation, the portable devices 100-2 and 100-4 may include a coil antenna (e.g., coil antenna 202) that contains multiple loops to form a rectangular or elliptical coil antenna 202 configuration.

At block 504, the coil antenna 202 may be used as a receiving coil antenna 202-2, or a transmitting coil antenna 202-4. For example, at receive mode such as, in block 506, the portable device 100-4 may receive magnetic fields (e.g., magnetic fields 306) that are generated by the other portable device 100-2. At transmit mode such as, in block 508, the portable device 100-2 may inject current (e.g., transmission current 302) at the transmitting coil antenna 202-4 to generate the magnetic fields 306. The portable device 100 may control transmit and receive operation of its radio component that includes the coil antenna 202; however, the coil antenna 202 is a passive device. In other words, the separation of the transmit mode and the receive mode at block 504 is made to help explain the working mechanism in the present implementation. In actual implementations, both transmit and receive operations may be implemented at the same time in the coil antenna 202.

At block 510, measuring an induced current that is generated by the received magnetic fields is performed. In an implementation, during the receive mode, the magnetic fields 306 may be captured by a flux guide (not shown) to generate magnetic fluxes (not shown). The magnetic fluxes may induce the current (e.g., induced current 304) that is measured by an amplitude detector (e.g., amplitude detector 404). The measured amplitude is a DC that is generated from an output of a rectifier (e.g., rectifier 402). For example, the rectifier 402 transforms the induced AC currents into DC.

At block 512, determining if the measured induced current is greater than a receiver threshold is performed. For example, the receiver threshold is configured to include a minimum value of induced current 304—at the receiving coil antenna 202-4—that is utilized to determine if a re-alignment of positions of the coil antennas 202 are required. In this example, if the induced current 304 is lesser than the receiver threshold, then at block 514, the receiving coil antenna 202-2 is re-aligned to obtain maximum power transfer. On the other hand, if the induced current 304 is greater than the receiver threshold, then at block 506, the receiving of the magnetic fields 306 is continued.

At block 516, generating magnetic fields of the same direction is performed. In an implementation, during the transmit mode, the NFC module may be configured to injected a current (e.g., transmission current 302) to generate the magnetic fields 306 that flow in the same direction. In this implementation, the magnetic fields that flow in the same direction provide assistance with one another due to their in-phase relationship. In other words, the transmitting coil antenna 202-4 is configured to generate maximum energy based from the transmission current 302.

At block 518, receiving information with regard to amount of induced currents at the receiving coil antenna is performed. For example, the received amount of the induced currents 304 is transmitted or communicated by the NFC module of the receiving coil antenna 202-2 to the transmitting coil antenna 202-4. In this example, the communication of the information may be implemented through IR signal, BlueTooth™ signal, NFC signal, cellular signal, or other radio frequency (RF) signal.

At block 520, determining if the received amount of induced current is greater than a transmitter threshold is performed. For example, the transmitter threshold is configured to include a minimum value of the induced current 304—at the receiving coil antenna 202-2—that is utilized to determine whether to stop the transmission of the charging power to avoid energy waste in the transmitting coil antenna 202-4. In this example, if the induced current 304 is lesser than the transmitter threshold, then at block 522, the transmitting coil antenna 202-4 is configured to stop transmission for the WPT. On the other hand, if the induced current 304 is greater than the transmitter threshold, then the injecting of the transmission current 302 to generate the magnetic fields 306 is continued at block 508.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A device comprising:
 a coil antenna of continuous loop; and
 a near field communications (NFC) module coupled to the coil antenna, the NFC module comprising:
  an amplitude detector that is configured to measure an induced current in the coil antenna at receive mode;
  an indicator that is configured to indicate receive power,
 wherein the NFC module is configured to transmit an amount of the measured induced current to another portable device, wherein the amount is utilized by an algorithm as a basis for stopping or continuing transmission of charging power by the another portable device.

2. The device as recited in claim 1, the receiver threshold is configured to include a minimum value of the measured induced current to determine if realigning is required.

3. The device as recited in claim 1, wherein the amplitude detector receives and measures a direct current (DC).

4. The device as recited in claim 1, wherein the device is selected from one of an Ultrabook, a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

5. The device as recited in claim 1 further comprising a rectifier to convert alternating induced current into a direct current (DC).

6. The device as recited in claim 1 further comprising an analog to digital converter (ADC) that receives and transforms an output of the amplitude detector into a digital signal, wherein the digital signal is utilized by the indicator or is further processed by an algorithm that is configured in the device.

7. An apparatus comprising:
 a coil antenna of continuous loop; and
 a near field communications (NFC) module coupled to the coil antenna, the NFC module comprising:
  a rectifier that is configured to convert an alternating induced current into a direct current (DC);
  an amplitude detector that is configured to measure the DC;
  an analog to digital converter (ADC) that is configured to transform the measured DC into a digital signal; and
  a receiver power indicator that is configured to display an amount of the digital signal;
 wherein the NFC module is configured to transmit the digital signal to another portable device, wherein the digital signal is utilized by an algorithm as a basis for stopping or continuing transmission of charging power by the another portable device.

8. The apparatus as recited in claim 7, wherein the coil antenna includes multiple loops to form a rectangular or elliptical coil antenna.

9. The apparatus as recited in claim 7, wherein the coil antenna is installed at a base of a device.

10. The apparatus as recited in claim 7, wherein the NFC module is configured to inject a transmission current to the coil antenna at transmit mode.

11. The apparatus as recited in claim 7, wherein the amount of digital signal is utilized as a basis for realigning a position of the coil antenna if the amount is lower than a receiver threshold, the receiver threshold is configured to include a minimum value of the alternating induced current to determine if realigning is required.

12. A device comprising: the apparatus as recited in claim 7, wherein the device is selected from one of an Ultrabook, a mobile phone, a cellular phone, a smartphone, a personal digital assistant, a tablet computer, a netbook, a notebook computer, a laptop computer, a multimedia playback device, a digital music player, a digital video player, a navigational device, and a digital camera.

13. A method of optimizing wireless charging in a device, the method comprising:
    establishing a near field coupling through a coil antenna of continuous loop;
    receiving magnetic fields by the coil antenna during receive mode;
    measuring an induced current that is generated by the magnetic fields;
    displaying the measured induced current, the measured induced current is utilized as a basis for re-aligning a position of the coil antenna if the measured induced current is lower than a receiver threshold, the receiver threshold is configured to include a minimum value of the measured induced current to determine if the re-aligning is required;
    receiving, at transmit mode, an amount of the measured induced current from another device, wherein the amount is utilized by an algorithm as a basis for stopping or continuing transmission of charging power to the another portable device.

14. The method as recited in claim 13, wherein establishing near field coupling includes the coil antenna that is installed at a base of the portable device.

15. The method as recited in claim 13, wherein establishing near field coupling includes the coil antenna that includes multiple loops to form a rectangular or elliptical coil antenna.

16. The method as recited in claim 13 further comprising injecting a transmission current to the coil antenna at transmit mode.

17. The method as recited in claim 13 further comprising converting an alternating measured induced current into measured direct current (DC).

* * * * *